US007894542B2

(12) United States Patent
Stirling-Gallacher (10) Patent No.: US 7,894,542 B2
(45) Date of Patent: Feb. 22, 2011

(54) DEVICE AND METHOD FOR CONTROLLING A SELECTION OF ANTENNAS IN A WIRELESS COMMUNICATION SYSTEM

(75) Inventor: Richard Stirling-Gallacher, Esslingen (DE)

(73) Assignee: Sony Deutschland GmbH, Berlin (DE)

( * ) Notice: Subject to any disclaimer, the term of this patent is extended or adjusted under 35 U.S.C. 154(b) by 692 days.

(21) Appl. No.: 11/842,536

(22) Filed: Aug. 21, 2007

(65) Prior Publication Data
US 2008/0056406 A1 Mar. 6, 2008

(30) Foreign Application Priority Data
Aug. 21, 2006 (EP) ................... 06017364

(51) Int. Cl.
*H04B 7/02* (2006.01)
*H04B 7/10* (2006.01)
(52) U.S. Cl. ..................... 375/267; 375/347
(58) Field of Classification Search ............ 375/260, 375/267, 299, 347
See application file for complete search history.

(56) References Cited
U.S. PATENT DOCUMENTS
6,754,286 B2 * 6/2004 Hottinen et al. ............ 375/299
7,403,748 B1 * 7/2008 Keskitalo et al. ............ 455/101
2006/0270343 A1 * 11/2006 Cha et al. .................... 455/25

FOREIGN PATENT DOCUMENTS
EP     1 553 717 A1    7/2005
EP     1 843 485 A1   10/2007
WO     WO 98/10531    3/1998
WO     WO 00/72464    11/2000

OTHER PUBLICATIONS
Ari Hottinen, et al., "Transmit Diversity by Antenna Selection in CDMA Downlink," Spread Spectrum Techniques and Applications, Proceedings, IEEE 5th International Symposium on Sun City, vol. 3, Sep. 2, 1998, pp. 767-770.
Yuuta Nakaya, et al., "MIMO Receiver Using an RF-Adaptive Array Antenna with a Novel Control Method", IEEE Communications Society, 2004, pp. 2568-2572.

* cited by examiner

*Primary Examiner*—Don N Vo
(74) *Attorney, Agent, or Firm*—Oblon, Spivak, McClelland, Maier & Neustadt, L.L.P.

(57) ABSTRACT

The present invention includes a device for transmitting and/or receiving signals in a wireless communication system, the device including a number of antennas, each of the antennas having a fundamental antenna beam radiation pattern, an antenna beam selection controller controlling a selection of the antennas for the transmission and/or reception of signals on the basis of channel estimates obtained at least for each of the fundamental antenna beam radiation patterns.

17 Claims, 11 Drawing Sheets

Example frame structure with N channel estimation slots

Example radiation pattern for beam antenna 1

Fig. 7

Example radiation pattern for beam antenna 2

Fig. 8

Example radiation pattern for beam antenna 3

Fig. 9

Example radiation pattern for beam antenna 4

Fig. 10

Example radiation pattern for combining antenna 2 with antenna 3

Fig. 11

Example radiation pattern for combining antenna 1 with antenna 2

Fig. 12

Example radiation pattern for combining antenna 1 with antenna 4

Fig. 13

Example radiation pattern for combining antenna 3 with antenna 4

Fig. 14

Example radiation pattern for combining antenna 2 with antenna 4

Fig. 15

Example radiation pattern for combining antenna 1 with antenna 3

Fig. 16

Example radiation pattern for combining antennas 2,3 and 4

Fig. 17

Example radiation pattern for combining antennas 1,3 and 4

Fig. 18

Example radiation pattern for combining antennas 1,2 and 3

Fig. 19

Example radiation pattern for combining antennas 1,2 and 4

Fig. 20

Example radiation pattern for combining antennas 1,2,3 and 4

DEVICE AND METHOD FOR CONTROLLING A SELECTION OF ANTENNAS IN A WIRELESS COMMUNICATION SYSTEM

BACKGROUND

The present invention relates to a device for transmitting and/or receiving signals in a wireless communication system and a method for controlling a selection of antennas in a wireless communication system.

The term "selection of antennas" as used in the present specification comprises the selection of antennas or antenna elements from a number of antennas or antenna elements in order to form or create a suitable antenna beam from the selected antennas or antenna elements, as well as the combination of some or all of the number of available antenna elements or antennas in order to form a suitable combined antenna beam.

Generally, antenna beams can be created in a transmitting and/or in a receiving device. They are typically created by selecting a suitable one out of a number of fixed beam antenna elements or antennas or by a combination of selected ones of the fixed beam antenna elements or antennas. A fixed beam antenna or antenna element can hereby be any kind of antenna or antenna element which has at least a temporarily fixed beam, e.g. a beam which is always pointing in the same (main) direction or a beam which is variable in relation to its direction but can be fix for a certain period of time.

Typically, the beam forming of antennas is used in radio communication systems in order to increase the signal-to-noise ratio (SNR). In case that interference between simultaneously or in parallel transmitted data streams or signals is present, antenna beam forming is used to increase the signal-to-interference-plus-noise ratio (SINR) by increasing the wanted signal power and/or decreasing the power of unwanted interference. In case of receiving devices which have more than one receiving chain, e.g. for a diversity reception, the reception of Multiple Input, Multiple Output (MIMO) transmissions and the like, it is important that the signals received by the different receiving chains are as uncorrelated as possible in order to optimize the performance.

SUMMARY

The object of the present invention is therefore to provide a device for transmitting and/or receiving signals in a wireless communication system and a method for controlling a selection of antennas in a wireless communication system, which enable to control a number of antennas in a way to achieve the best performance.

The above object is achieved by a device for transmitting and/or receiving signals in a wireless communication system including
  a number of antennas, each of the antennas having a fundamental antenna beam radiation pattern,
  an antenna beam selection controller configured to control a selection of the antennas for the transmission and/or reception of signals on the basis of channel estimates obtained for each of the fundamental antenna beam radiation patterns and at least for some combinations of the fundamental antenna beam radiation patterns, and
  a channel estimator configured to obtain a channel estimate for a combination of fundamental antenna beam radiation patterns by the sum of the channel estimates of the corresponding fundamental antenna beam radiation patterns divided by the number of corresponding fundamental beam positions.

The above object is further achieved by a method for controlling a selection or combination of antennas in a wireless communication system including the steps of
  controlling a selection or combination of antennas for the transmission and/or reception of signals from a number of antennas, each of the number of antennas having a fundamental antenna beam radiation pattern, on the basis of channel estimates obtained at least for each of the fundamental antenna beam radiation patterns and at least for some combinations of the fundamental antenna beam radiation patterns, and
  obtaining a channel estimate for a combination of fundamental antenna beam radiation patterns by the sum of the channel estimates of the corresponding fundamental antenna beam radiation patterns divided by the number of corresponding fundamental beam positions.

The term "antenna" is hereby intended to comprise all kinds of antennas, antenna elements, antenna devices, antenna array elements and the like. Each of the antennas has a fundamental antenna beam radiation pattern. The term "fundamental antenna beam radiation pattern" is hereby intended to comprise fixed (or at least temporarily fixed) beam directions, such as directed beam positions, narrow beam positions and the like, as well as omni-directional antenna beams. The number of antennas can comprise a combination of antennas with fixed (or temporarily fixed) or narrow beam antenna beams and omni-directional antenna beams, or comprises only antennas with a narrow beam direction or antennas with an omni-directional beam shape. Further, in case that some or all of the number of antennas have a narrow or directed beam, the directions of the different beams can be the same or can be different for each of the antennas. The term "fundamental" is intended to comprise any kind of main, essential, predominant and the like radiation direction which characterizes the radiation direction of the respective fixed or temporarily fixed antenna beam.

According to the present invention, the selection of antennas for the transmission and/or reception of signals is controlled on the basis of channel estimates obtained at least for each of the fundamental antenna beam radiation patterns. In case that channel estimates are available or obtained for combinations of the fundamental antenna beam radiation patterns, these channel estimates are also used to control the selection of antennas for the transmission and/or reception of signals.

Advantageously, a channel estimator is provided which is adapted to obtain the channel estimates on the basis of channel estimation information received for at least each of the fundamental antenna beam radiation patterns. Advantageously, the communication system is a system in which signals are transmitted and received in preambles and data sections, a preamble comprising a respective preamble slot with channel estimation information for at least each of said fundamental antenna beam radiation patterns, wherein said antenna beam selection controller is adapted to control a selection of said antennas so that each antenna receives the respective preamble slot with the channel estimation information for the respective fundamental antenna beam and wherein said channel estimator is adapted to obtain a channel estimate for at least each of said fundamental antenna beam radiation patterns from the respective received channel estimation information.

Further advantageously, said antenna beam selection controller is adapted to control a selection of said antennas for the transmission and/or reception of signals on the basis of channel estimates obtained at least for each of the fundamental antenna beam radiation patterns and at least for some combinations of the fundamental antenna beam radiation patterns, wherein said channel estimator is adapted to obtain a channel estimate for a combination of fundamental antenna beam radiation patterns on the basis of the channel estimates of the fundamental antenna beam radiation patterns. Hereby, said channel estimator is advantageously adapted to obtain a channel estimate for a combination of fundamental antenna beam radiation patterns by the sum of the channel estimates for the fundamental antenna beam radiation patterns of said combination divided by the number of fundamental antenna beam radiation patterns of said combination.

Further advantageously, the antenna beam selection controller is adapted to control the selection of antennas by calculating a signal-to-noise value on the basis of the obtained channel estimates. This is particularly suitable in case that the device of the present invention comprises a single receiver chain. It is to be noted that the signal-to-noise value can e.g. be a signal-to-noise ratio value or a signal-to-interference-plus-noise ratio or estimates thereof. Advantageously, the antenna beam selection controller is adapted to control a selection of antennas on the basis of one of the highest of said calculated signal-to-noise values.

Alternatively, the antenna beam selection controller is adapted to control a selection of antennas on the basis of a signal-to-noise value and a correlation factor. This signal-to-noise value can also be a SNR or SINR value or an estimate thereof. This alternative is particularly suitable if the device of the present invention comprises two or more receiver chains. In this case, the antenna beam selection controller is advantageously adapted to control a selection of antennas on the basis of one of the highest of said calculated signal-to-noise values and one of the lowest of said correlation factors. Further advantageously, the antenna beam selection controller is adapted to calculate the correlation factors on the basis of a correlation matrix in this case. Hereby, the antenna beam selection controller is advantageously adapted to calculate said correlation factor on the basis of the sum of the power of the non-diagonal elements of the correlation matrix divided by the sum of the power of the diagonal elements of the correlation matrix.

The method according to the present invention can be further advantageously implemented by the method steps of one of the dependent method claims.

Further, the present invention is directed to a computer program adapted to be loaded into an internal memory of a communication device, wherein said computer program is adapted to perform the method of one of the method claims of the present invention and run on said communication device.

BRIEF DESCRIPTION OF DRAWINGS

The present invention is further explained in more detail in the following description of preferred embodiments in relation to the enclosed drawings, in which.

DETAILED DESCRIPTION

Figure 1:
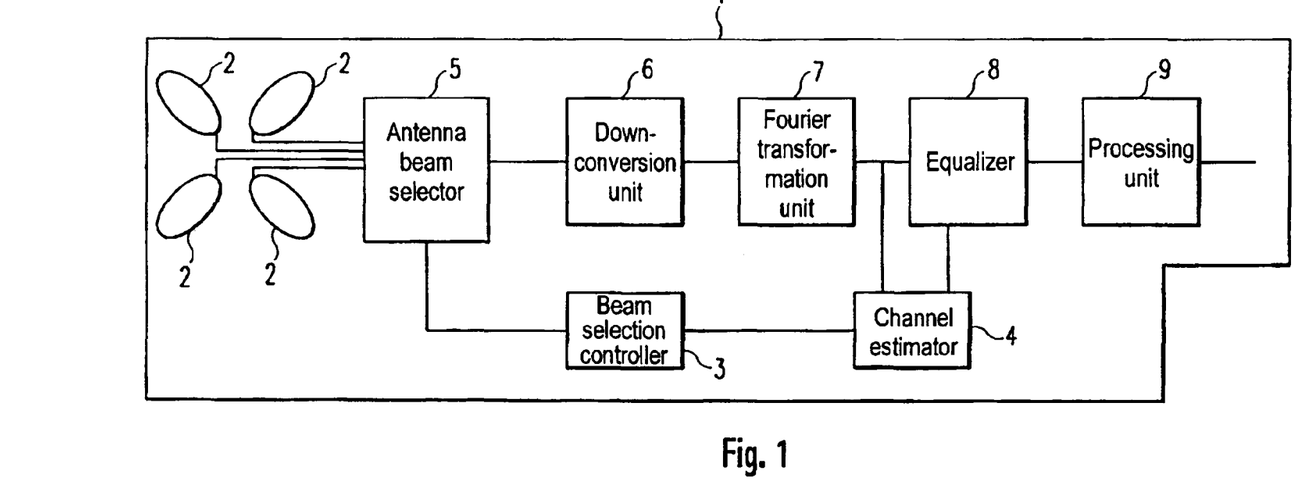
FIG. 1 shows a schematic block diagram of a transmitting and/or receiving device of the present invention.

FIG. 1 schematically shows an example of a device 1 for transmitting and/or receiving signals in a wireless communication system, e.g. an orthogonal frequency division multiplexing (OFDM) system, according to the present invention. In FIG. 1, only elements of the device 1 according to the present invention which are necessary to explain and understand the present invention are shown. However, it is to be understood that a practical implementation of the transmitting and/or receiving device would comprise additional elements necessary for the practical operation.

The device 1 is adapted to receive signals in the wireless communication system via a number of antennas 2, whereby each of the antennas 2 has a fundamental antenna beam radiation pattern. Hereby, the wireless communication system can be any kind of wireless communication system enabling the transmission and/or reception of signals over short range, middle range or long range distances, using any kind of present or future communication system, including but not limited to a GSM system, a UMTS system, WLAN system, short range, mid range, long range systems, any kind of modulation and so forth.

The device 1 comprises a number of antennas 2, whereby each antenna 2 can be implemented as an antenna, antenna element, an antenna device, an antenna unit, part of an antenna array or the like. Each of the antennas 2 has a fundamental antenna beam radiation pattern. E.g., in case that each of the antennas 2 has a fixed omni-directional transmission and/or reception characteristic, this omni-directional characteristic is the fundamental antenna beam radiation pattern. As a further example, in case that each antenna 2 has a narrow beam or directional antenna characteristic, this direction beam characteristic would be the fundamental antenna beam radiation pattern.

The device 1 comprises an antenna beam selection controller 3 adapted to control a selection of said antennas 2 for the transmission and/or reception of signals on the basis of channel estimates obtained at least for each of said fundamental antenna beam radiation patterns. The antenna beam selection controller 3 hereby controls an antenna beam selector 5 which selects one or more of said antennas 2 or any kind of combination of two or more of said antennas 2 on the basis of respective control signals received from the antenna beam selection controller 3. Hereby, a combined transmission and/or reception beam of the selected antennas 2 or a combination of the selected antennas 2 is formed in order to achieve the best transmission and/or reception performance. The selection of the antennas 2 in the antenna beam selection controller 3 is hereby controlled on the basis of channel estimates obtained from a channel estimator 4.

As stated further above, the device 1 comprises all elements necessary for the reception and/or transmission of signals in a wireless communication system, whereby some of the elements are shown in FIG. 1 and some other elements are omitted for the sake of clarity. E.g., the device 1 comprises a downconversion unit 6 for downconverting signals received via the number of antennas 2 through the antenna beam selector 5. The downconverted signals from the downconversion unit 6 are forwarded to a Fourier transformation unit 7 which transforms the time domain signals into frequency domain signals, which are then equalized by an equalizer 8 and, after equalization, further processed in a processing unit 9 e.g. by de-interleaving the signals and so forth. The processed signals are then further processed in the device 1 as necessary. In the equalizer 8, channel estimation values obtained and calculated by the channel estimator 4 from the time domain signals output by a Fourier transformation unit 7 are used. The detailed functionality of a channel estimator 4 is known in the art and is omitted here for the sake of clarity. In brief, the channel estimator 4 provides a channel estimate value for each transmission channel of the communication system. According to the present invention, the channel estimator 4 obtains a channel estimate for at least each of the fundamental antenna beam radiation patterns of the antennas 2 on the basis of correspondingly received channel estimation information. Hereby, in the wireless communication system of the present invention, a separate channel estimation is transmitted for at least each of the fundamental antenna beam radiation patterns of the antennas 2. E.g., if the number of antennas 2 is N (N being a natural number), at least N different channel estimation information values are transmitted in the wireless communication system and received by the antennas 2. Hereby, the reception of the channel estimation information values by the respective antennas 2 is controlled by the antenna beam selection controller 3 in a way that each antenna 2 receives its respectively allocated channel estimation information value. E.g., in case that the wireless communication system of the present invention transmits and receives signals and preambles and data sections, as shown schematically in FIG. 5, the preamble section may comprise N different channel estimation slots, whereby channel estimation information values for each of the antennas 2 is transmitted in each of the channel estimation slots N. In other words, for each of the channel estimation slots N, the antenna beam selection controller 3 switches to a different antenna 2 and is therefore adapted to obtain a channel estimate for each of the fundamental antenna beam radiation patterns for each preamble. This principle can also be adapted to combinations of antennas 2 and therefore to combinations of the fundamental antenna beam radiation patterns. E.g., the maximum number of combinations of fundamental antenna beam radiation patterns of antennas 2 is $2^N-1$, in which case $2^N-1$ channel estimation slots could be transmitted in the preamble section. However, according to the present invention it is more advantageous to only transmit N channel estimation slots, since the present invention enables the calculation of channel estimates for the $2^N-1$ combinations on the basis of the N channel estimation information values.

Figure 3:
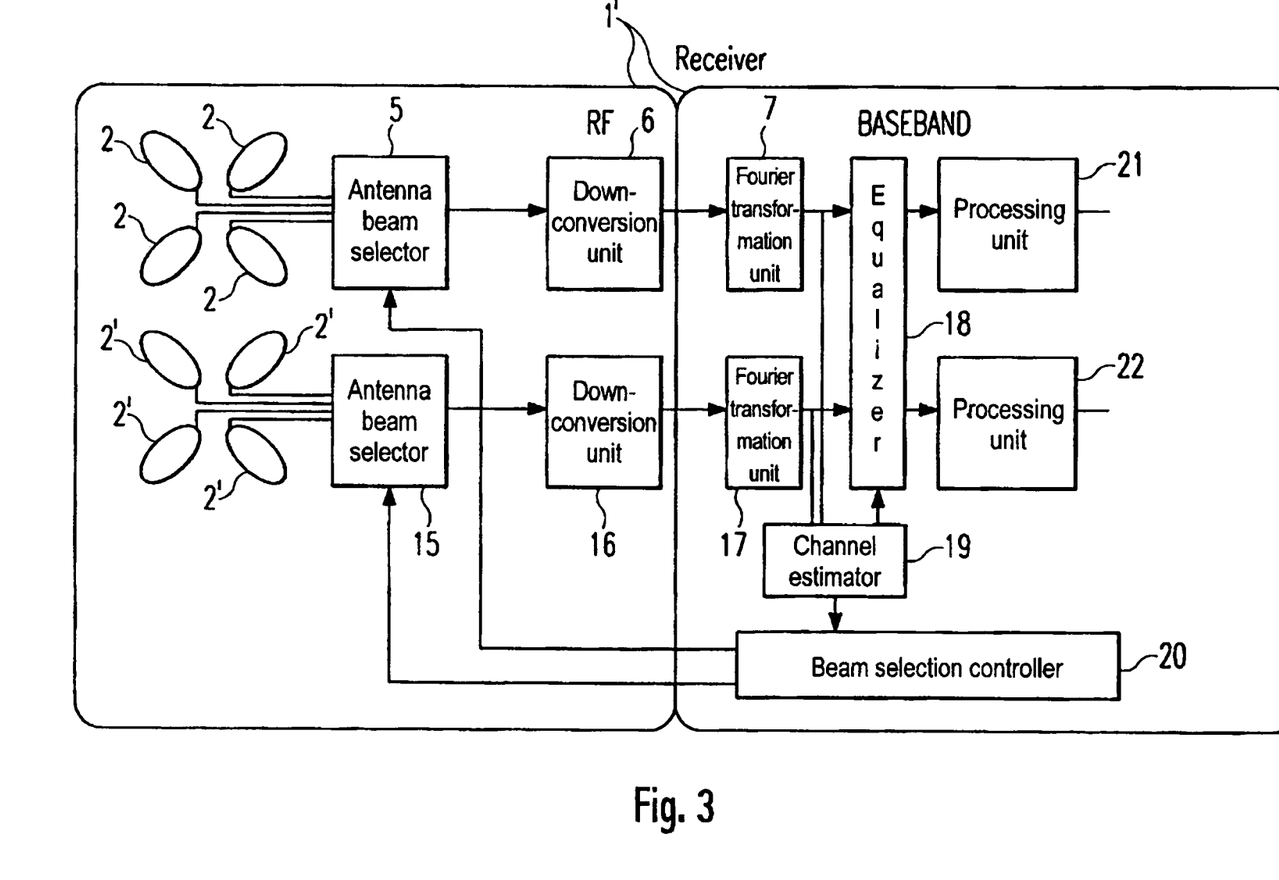
FIG. 3 shows a schematic block diagram of an alternative embodiment of the transmitting and/or receiving device of the present invention.

It is to be noted that the device 1 shown in FIG. 1 only shows a single receiver chain. However, the concept of the present invention can also be applied to multiple receiver chains, such as two or more receiver chains. An example is shown in FIG. 3, in which an alternative embodiment of a device 1' for transmitting and/or receiving signals in a wireless communication system according to the present invention is shown, which has two receiver chains. The first receiver chain with a number of antennas 2, an antenna beam selector 5, a downconversion unit 6, a Fourier transformation unit 7 corresponds to corresponding elements of the device 1 of FIG. 1. Further, a second receiver chain with a number of antennas 2', an antenna beam selector 15, a downconversion unit 16 and a Fourier transformation unit 17 is shown. All explanations and functionalities explained above in relation to the antennas 2 also apply to the antennas 2'. The same is true for the antenna beam selector 15 in view of the antenna beam selector 5, the downconversion unit 16 in relation to the downconversion unit 6 and the Fourier transformation unit 17 in relation to the Fourier transformation unit 7. The device 1' further comprises an equalizer 18 which is adapted to equalize the signals from both the Fourier transformation units 7 and 17 in the same way as the equalizer 8. The equalized signals are then further processed in the two parallel processing units 21 and 22 in a suitable manner. A channel estimator 19 obtains and calculates channel estimates from the signals output by the Fourier transformation units 7 and 17 and provides channel estimation values to the equalizer 18 as well as to an antenna beam selection controller 20. The antenna beam selection controller 20 works in the same way as explained above in relation to the antenna beam selection controller 3, but controls the antenna beams of the number of antennas 2 as well as the number of antennas 2'. The number antennas 2' is hereby selected and controlled via the antenna beam selector 15.

Figure 2:
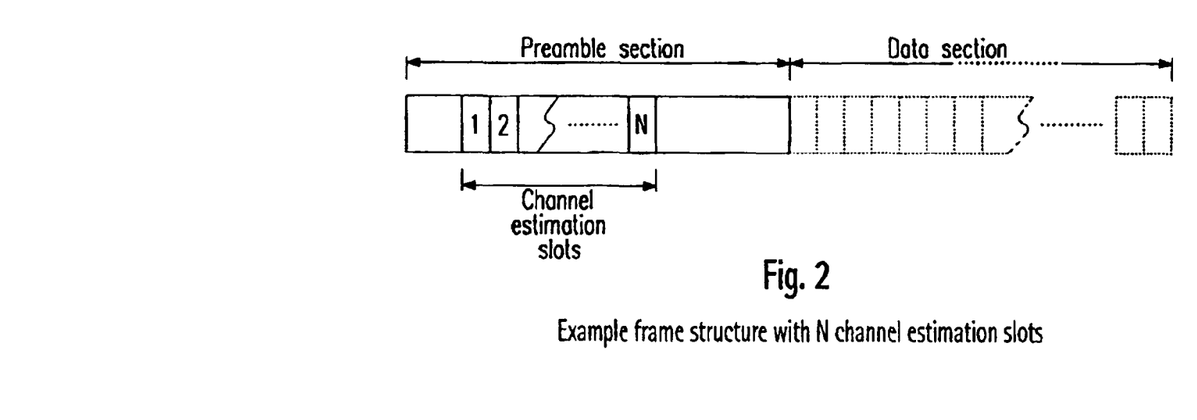
FIG. 2 shows a schematic example of a preamble section and a data section according to the present invention.
Figure 4:
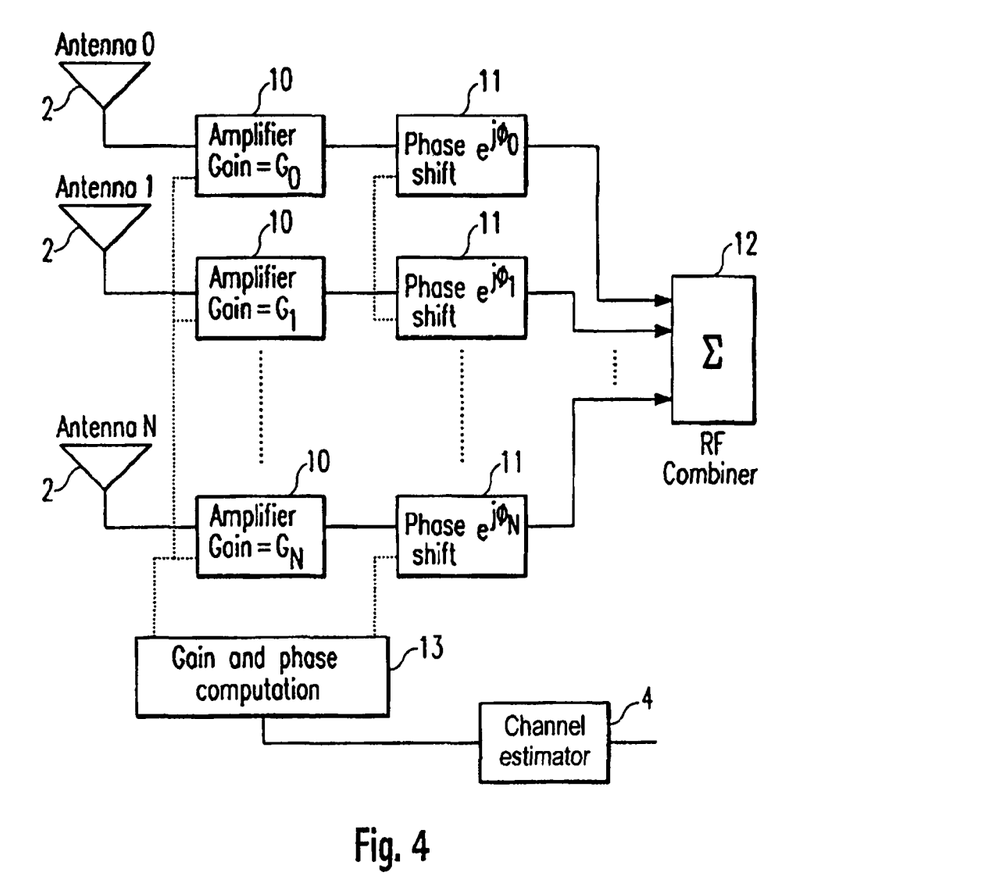
FIG. 4 shows a schematic block diagram of a first possible implementation of some of the elements of the device shown in FIG. 1.

A non-limiting example for an implementation of an antenna beam selector 5 and/or 15 is shown in FIG. 4. FIG. 4 shows a beam forming structure which uses a combination of fixed (or temporarily fixed) antenna branches, one antenna branch for each antenna 2. The antennas 2 may have omni-directional characteristics or any other kind of directional characteristics depending on the wanted implementation. Each branch of each antennas 2 has a gain amplifier 10 and an RF phase shifter 11. The gain amplifiers 10 and the phase shifters 11 are connected to and controlled by a gain and phase computation unit 13 which is an example for an implementation of the antenna beam selection controller 3 or 20. By changing the phase shifter for each branch of each antenna 2, the angle of the received signal for which the combined N branches has the highest gain is changed and therefore the received beam (or transmitted beam) can be steered. By changing the amplifier gain for each antenna branch, the weight of the individual branches for the succeeding RF combiner 12, in which the signals from the antenna branches are combined, is changed and therefore the exact beam receiver sensitivity (beam transmitter sensitivity) against angle can be changed. If only a certain set of beams need to be used, the exact gain and phases required for the different branches can be stored in a lookup table or computed on-line in the gain and phase computation unit 13 and these beams can then be selected correspondingly. The combined signal output from the RF combiner 12 is then further processed in the downconversion unit 6 (and/or the downconversion unit 16). It is to be understood that FIG. 2 shows the case for a receiving device. For a transmitting device, a similar arrangement is used but the signals travel from right to left and not from left to right and the RF combiner 12 is replaced by a power splitter. An alternative implementation of the amplification gain control and phase shifting for each antenna branch instead of the RF part of the transmitting and/or receiving device as shown in FIG. 4 is the implementation in the base band structure of the transmitting and/or receiving device.

Figure 5:
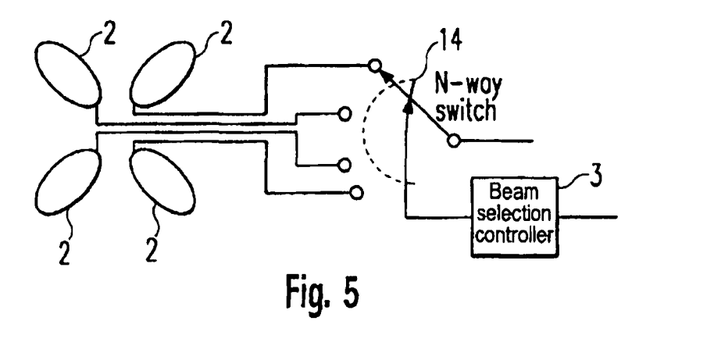
FIG. 5 shows a schematic block diagram of a second possible implementation of some of the elements of the device shown in FIG. 1.

FIG. 5 shows a further alternative implementation example for an antenna beam selector 5. In the example of FIG. 5, the antenna beam selector 5 is implemented as an N-way switch 14 adapted to selectively switch to and choose one of the number of N antennas 2. Each of the antennas 2 has a different radiation pattern so that by choosing the best suited radiation pattern and the corresponding antenna 2 the best performance can be achieved. The N-way switch 14 is controlled by the antenna beam selection controller 3 in the usual manner. In this implementation example, a combination of two or more antennas 2 is not possible. The shown implementation of FIG. 5 can be equally applied to a transmitting and a receiving device 1.

It is to be understood that the implementation examples of FIGS. 4 and 5 are only examples and that alternative and/or additional implementations are possible, such as an implementation in which not only single antennas 2 can be selected by the antenna beam selector 5, but also combinations of two or more of the antennas 2 can be combined in order to obtain the best beam for the given transmission and reception scenario.

In the following, the functionalities of the channel estimator 4, 19, the antenna beam selection controller 3, 20 are explained in more detail.

Hereby, in order to explain the implementation, and implementation structure and method to select and combine the antenna beams for the communication device 1, 1' which is in receiving mode is explained. However, the selected beams can be used by the communication device 1, 1' at a later time period during the transmitting mode. Therefore, specifically for communication systems using time division duplex and which the channels are not significantly changing between uplink and downlink time slots (reciprocal channel case), the method and implementation described in the following for the beam selection/combination can be readily applied for a transmitter device as well as for a receiver device.

For the following explanation is assumed that the beams are formed using the fixed beam switching as shown and explained in relation to FIG. 5 and the fixed beam combining as shown and explained in relation to FIGS. 1 and 3, but it is to be understood that the concept of the present invention is also applicable to the beam forming as explained in relation to FIG. 4, when a finite number of beams are used using the described gain and phase computation (or lookup table) computation in the block 13 or in a similar block if the beams are formed in base band processing.

In order to explain the idea underlying the present invention, the following explanation is split into two parts, namely the channel estimation and the beam selection.

Channel Estimation Performed by Channel Estimator 4, 19

As explained above in relation to FIG. 2, according to the present invention a channel estimation information value is available for each of the antennas 2 or 2', e.g. by providing a channel estimation slot for each of the antennas 2 in a preamble section.

The present invention proposes that for each of these channel estimation slots, the receiver (or the communication unit in receiving mode) switches to a different fundamental beam position and thereby can obtain a channel estimate for each of the fundamental beam positions for each preamble.

For a typical mobile communications system operating in a multi-path channel, each channel estimate will have many components spaced in time. To simplify the mathematical explanation here, it is assumed that the channel estimate for each beam is a single complex value, which corresponds to the case of a typical channel estimate for an orthogonal multiplexing division system (OFDM) system or a system for which there is a only a single multi-path component. All the concepts presented here, can of course be used for other systems.

Furthermore, since the receiver 1, 1' may have $n_R$ receiver chains which could each receive signals from $n_T$ transmitters on M sub-carriers, a general representation for channel estimation is given by $h_{m,rt}(i)$ where m denotes the sub-carrier number (m=1, ..., M), r denotes the receiver number (r=1, ..., $n_R$), t denotes the transmitter number (t=1, ..., $n_T$) and i denotes the beam number (i=1, ..., N). For simplicity and without loss of generality, it is assumed in this section here that the device 1, 1' has one receiver chain and is receiving a signal from one transmitter. The following refers to the channel estimates for one carrier and therefore the subscript m is dropped for the sake of clarity. The channel estimates for the fundamental beam (fundamental antenna beam radiation pattern) will therefore be denoted as h(i) where i=1, ..., N.

If the receiver 1, 1' is capable of combining the fundamental beams it is proposed that the channel estimations for the combined beams are obtained from the summation of the corresponding fundamental beams. Denoted mathematically, channel estimation b(j) for the fundamental beams and their combinations, where j=1, ..., $2^N-1$ is given by, $$b(j) = \frac{\sum_{i \in A_j} h(i)}{C_j} \quad (1)$$

Where $A_j$ is the set of fundamental beams which are summed to form the beam number j and $C_j$ is the number of beams which are contained in the set $A_j$.

To explain this more clearly, as an example a system with N=4 fixed beam antennas is used. It is to be understood, however, that the present invention is not limited to this number. The radiation patterns of these fixed beam antennas in this example are shown in FIG. 6, FIG. 7, FIG. 8 and FIG. 9. These beams can be combined in 15 different ways ($2^N-1=15$). Table 1 summarizes these combinations and presents for each combination, the members of the set $A_j$ and the numerical value of $C_j$ so that equation 1 can be calculated. For each combination, the relevant figure, for the corresponding antenna radiation pattern is also presented.

TABLE 1

Example fixed beam antenna combinations (N = 4)

Figure 6:
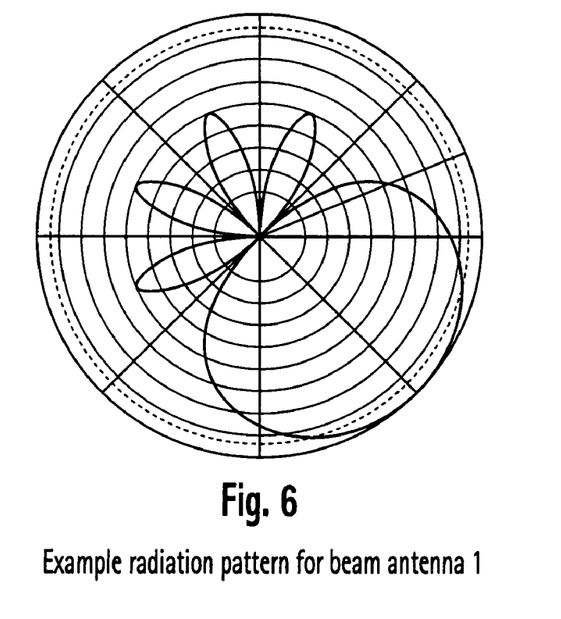
FIG. 6 shows a first example of a radiation pattern.
Figure 7:
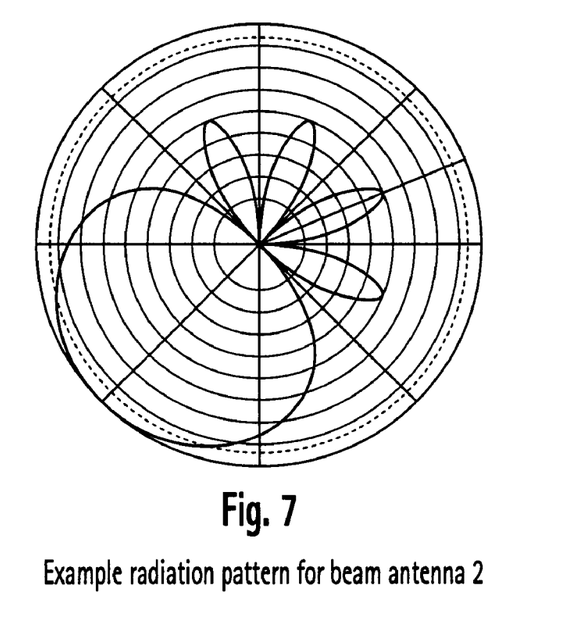
FIG. 7 shows a second example of a radiation pattern.
Figure 8:
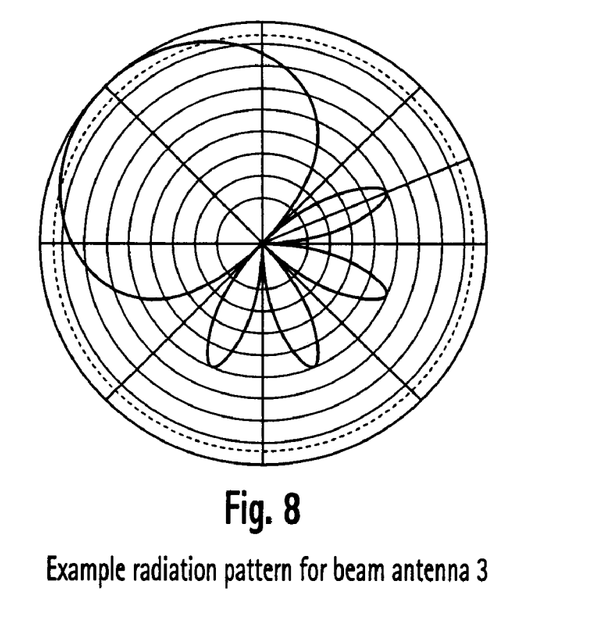
FIG. 8 shows a third example of a radiation pattern.
Figure 9:
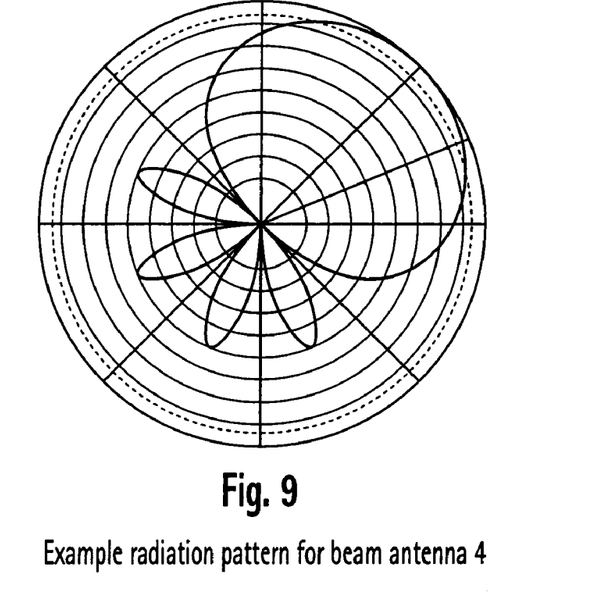
FIG. 9 shows a fourth example of a radiation pattern.
Figure 10:
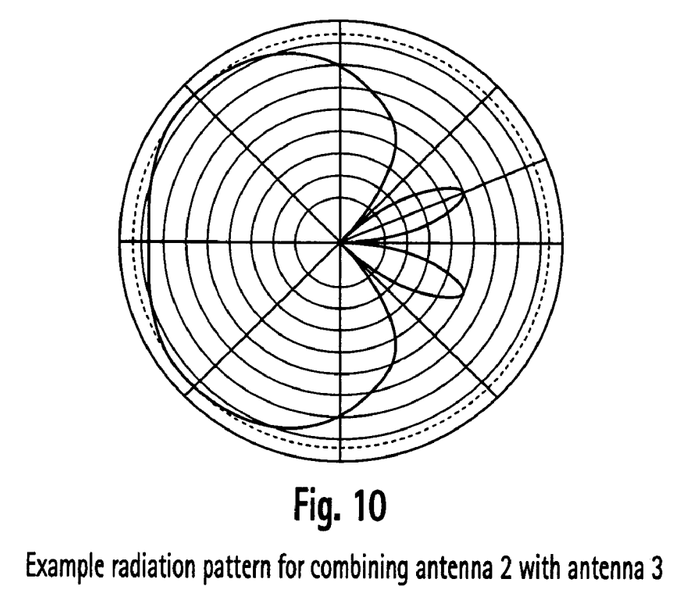
FIG. 10 shows a fifth example of a radiation pattern.
Figure 11:
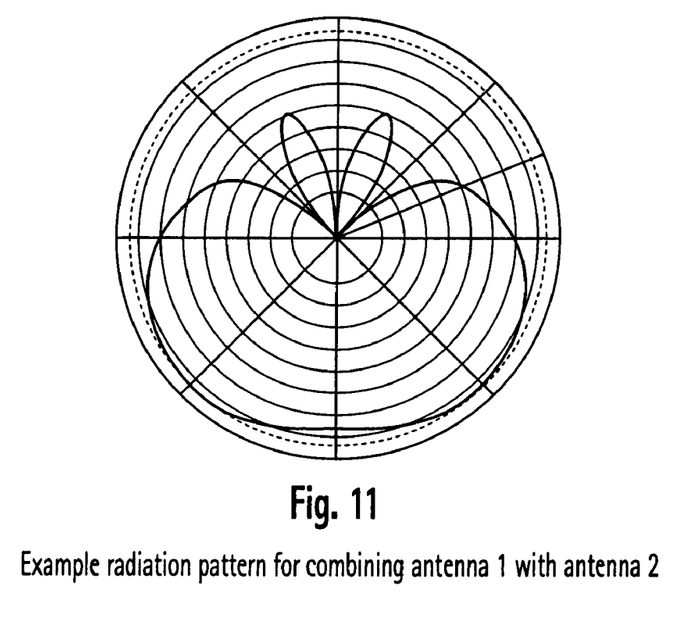
FIG. 11 shows a sixth example of a radiation pattern.
Figure 12:
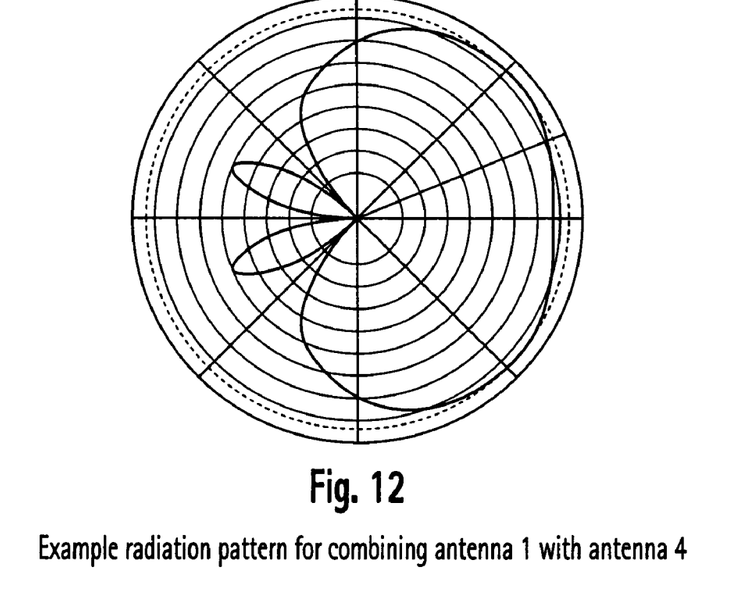
FIG. 12 shows a seventh example of a radiation pattern.
Figure 13:
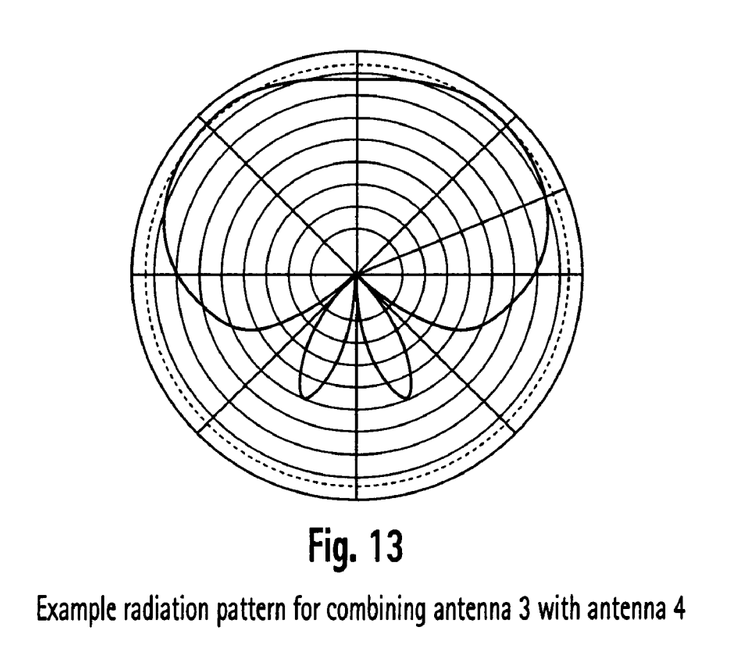
FIG. 13 shows an eighth example of a radiation pattern.
Figure 14:
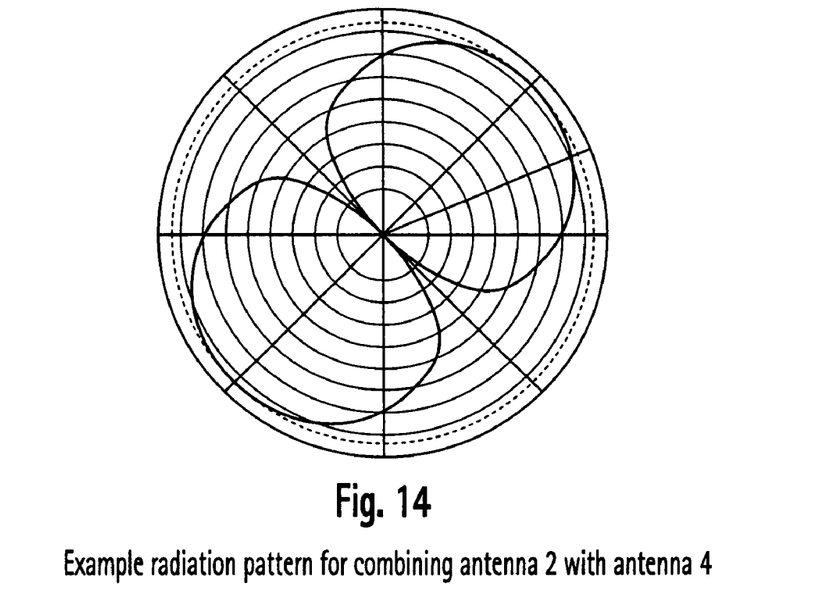
FIG. 14 shows a ninth example of a radiation pattern.
Figure 15:
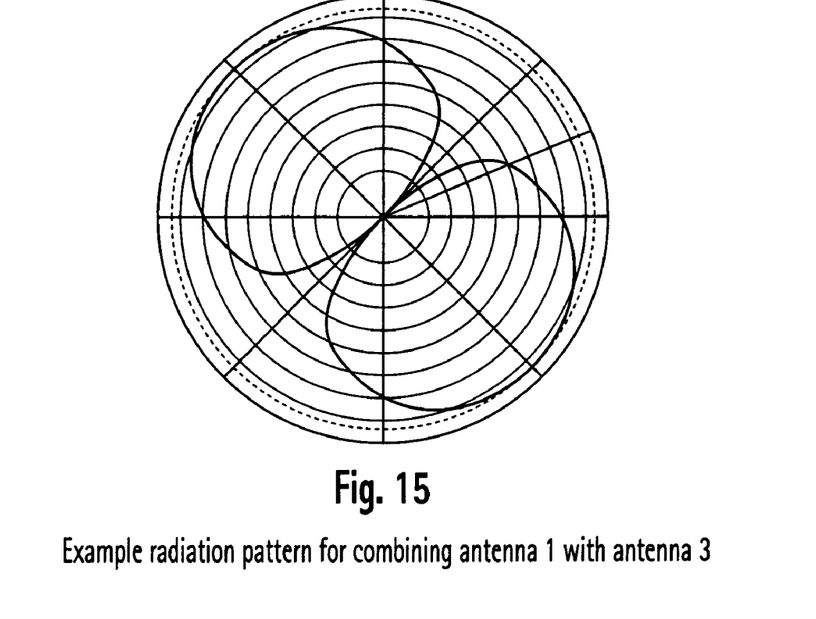
FIG. 15 shows a tenth example of a radiation pattern.
Figure 16:
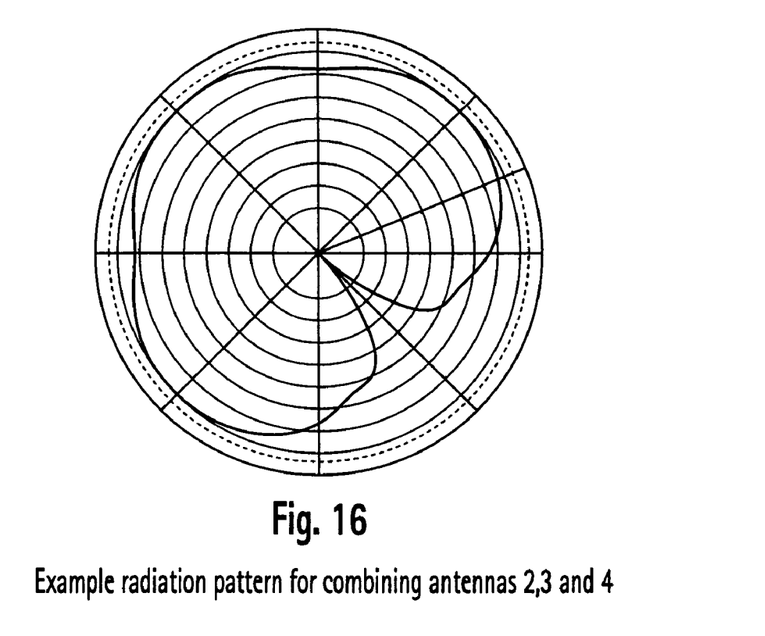
FIG. 16 shows an eleventh example of a radiation pattern.
Figure 17:
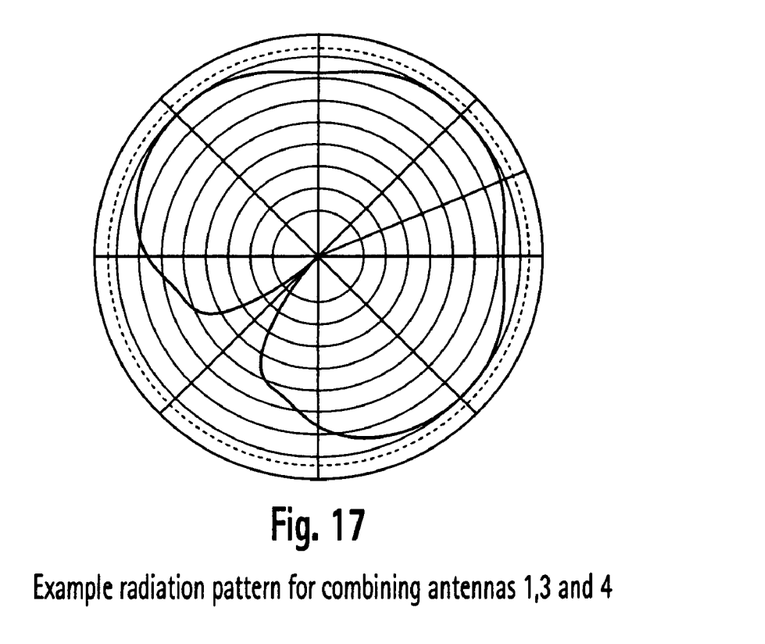
FIG. 17 shows a twelfth example of a radiation pattern.
Figure 18:
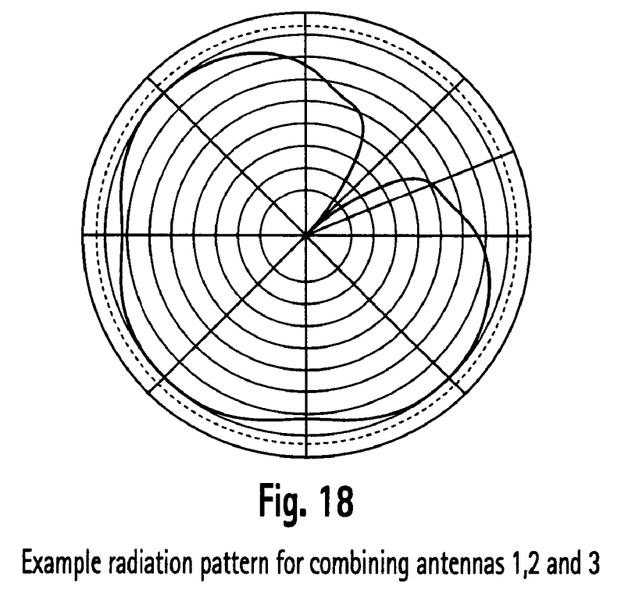
FIG. 18 shows a thirteenth example of a radiation pattern.
Figure 19:
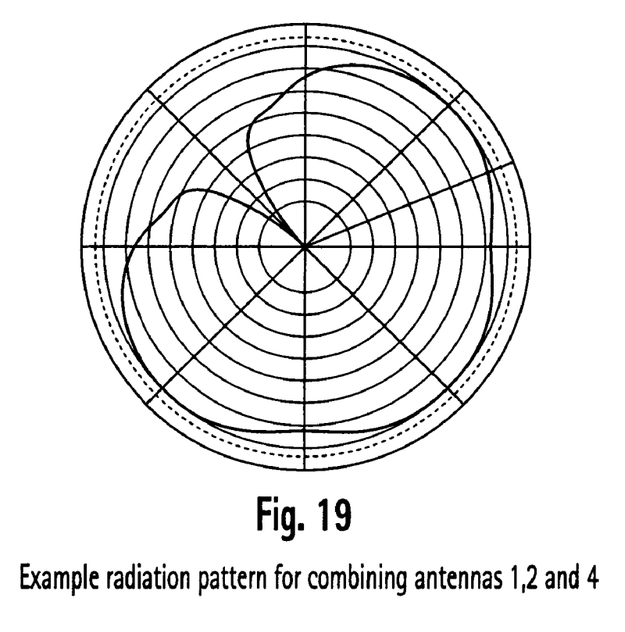
FIG. 19 shows a fourteenth example of a radiation pattern.
Figure 20:
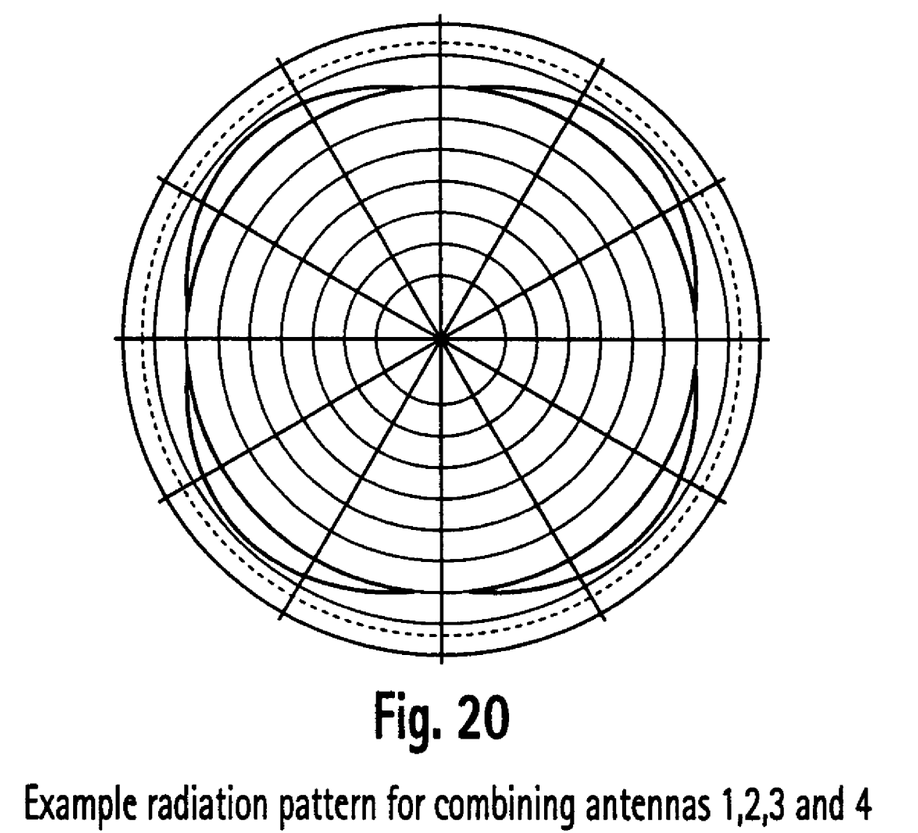
FIG. 20 shows a fifteenth example of a radiation pattern.

| Combination number j | Set Aj | Cj | Example Radiation patterns |
|---|---|---|---|
| j = 1 | $A_1 = \{1\}$ | $C_1 = 1$ | FIG. 6 |
| j = 2 | $A_2 = \{2\}$ | $C_2 = 1$ | FIG. 7 |
| j = 3 | $A_3 = \{3\}$ | $C_3 = 1$ | FIG. 8 |
| j = 4 | $A_4 = \{4\}$ | $C_4 = 1$ | FIG. 9 |
| j = 5 | $A_5 = \{2, 3\}$ | $C_5 = 2$ | FIG. 10 |
| j = 6 | $A_6 = \{1, 2\}$ | $C_6 = 2$ | FIG. 11 |
| j = 7 | $A_7 = \{1, 4\}$ | $C_7 = 2$ | FIG. 12 |
| j = 8 | $A_8 = \{3, 4\}$ | $C_8 = 2$ | FIG. 13 |
| j = 9 | $A_9 = \{2, 4\}$ | $C_9 = 2$ | FIG. 14 |
| j = 10 | $A_{10} = \{1, 3\}$ | $C_{10} = 2$ | FIG. 15 |
| j = 11 | $A_{11} = \{2, 3, 4\}$ | $C_{11} = 3$ | FIG. 16 |
| j = 12 | $A_{12} = \{1, 3, 4\}$ | $C_{12} = 3$ | FIG. 17 |
| j = 13 | $A_{13} = \{1, 2, 3\}$ | $C_{13} = 3$ | FIG. 18 |
| j = 14 | $A_{14} = \{1, 2, 4\}$ | $C_{14} = 3$ | FIG. 19 |
| j = 15 | $A_{15} = \{1, 2, 3, 4\}$ | $C_{15} = 4$ | FIG. 20 |

For this example, by referring to equation 1 and Table 1, for combination 14 (which has a radiation pattern as shown in FIG. 19) the channel estimation b (14) is computed as follows, $$b(14) = \frac{h(1) + h(2) + h(4)}{3}. \quad (2)$$

Beam Selection Performed by Antenna Beam Selection Controller 3, 20

If the beams can be combined, the decision made in the antenna beam relation controller 3, 20 as to which beam combination (from the $2^N-1$ possibilities) is best is based on the channel estimates b (j) where j=1, ... $2^N-1$. Alternatively if the beams cannot be combined the decision as which beam is best (from the N possibilities) is based on is based on the channel estimates h (i) where i=1, ..., N. To simplify (but without limiting the invention) the mathematics here it is assumed that the beams are not combined and therefore the channel estimates are denoted as h (i) where i=1, ..., N. The presented structure and method can of course directly be applied to case where the beams are combined.

The following makes a distinction between receivers 1 which have one receiver chain and receivers 1' which have multiple receiver chains.

Beam Selection by the Controller 3 for Receivers 1 with One Receiver Chain

For receivers 1, which have only one receiver, it is proposed that the beam which has a channel estimate corresponding to the highest signal to noise ratio (SNR) or the highest average signal to interference plus noise ratio, (SINR) should be selected. In the next sub-section possible ways to estimate the SINR from the channel estimates are explained.

Beam Selection by Controller 3 for Receivers 1 with One Receiver Chain—Possible SINR Methods Some possible implementations or methods to calculate the average SINR for each beam possibility i for different system configurations are as follows, (a) A single carrier system with one receiver and one transmitter $$SINR(i) = \frac{|h(i)|^2}{\sigma_n^2 + I_n^2(i)} \quad (3)$$

(b) System with one receiver, one transmitter and M sub-carriers (≡typical OFDM system)

$$SINR(i) = \frac{\frac{1}{M}\sum_{m=1}^{M} |h_m(i)|^2}{\sigma_n^2 + I_n^2(i)} \quad (4)$$

(c) System with one receiver, receiving signals from $n_T$ transmitters with M sub-carriers (≡typical OFDM system with transmit diversity)

$$SINR(i) = \frac{\frac{1}{M} \cdot \sum_{m=1}^{M}\sum_{t=1}^{n_T} |h_{m,1t}|^2}{\sigma_n^2 + I_n^2(i)} \quad (5)$$

Where M is the number of sub-carriers, $n_T$ is the number of transmitter antennas, $\sigma_n^2$ is the variance of the noise and $I_m^2(i)$ is the power of the interference for beam possibility i.

Other methods to estimate the SINR are also possible.

Beam Selection by Controller 20 in Receivers 1' with Multiple Receiver Chains

For receivers, e.g. receiver 1', which have multiple receiver chains, it is proposed that the beams for the different receivers are selected so as to maximise the average SINR (or SNR) ratio, and to minimise the correlation factor of the different channel responses between the transmitters and the receivers.

Since it may not always be possible to find a beam position which maximises the SINR and at the same time minimises the correlation factor, an alternative selection rule would be that the chosen beam q has a SINR value which is within the top T SINR values possible and that the correlation factor is within the lowest U values possible. T and U are implementation specific.

In the next section it is explained how the average SINR can be calculated for multiple receiver chains and proposes a new method to calculate the correlation factor.

Beam Selection in Controller 20 with Receivers with Multiple Receiver Chains—Possible SINR Methods Since each receiver has N beam possibilities (or $2^N-1$ possibilities if the beams for each receiver are combined), the total number of beam possibilities for the multiple receiver case is $n_R N$ (or $n_R(2^N-1)$ possibilities if the beam for each receiver can be combined). These possibilities are indexed using the variable q.

Some possible methods to calculate the average SINR for each of these beam possibilities q, for different system configurations is as follows, (a) A single carrier system with $n_R$ receivers and one transmitter $$SINR(q) = \frac{\frac{1}{n_R}\sum_{r=1}^{n_R} |h_{r1}(q)|^2}{\sigma_n^2 + I_n^2(q)} \quad (6)$$

System with $n_R$ receivers, one transmitter and M sub-carriers
(≡typical OFDM system with receiver diversity)

$$SINR(q) = \frac{\frac{1}{Mn_R} \cdot \sum_{m=1}^{M}\sum_{r=1}^{n_R} (|h_{m,r1}(q)|^2)}{\sigma_n^2 + I_n^2(q)} \quad (7)$$

System with $n_R$ receivers, one transmitter and M sub-carriers
(≡typical MIMO OFDM system)

$$SINR(q) = \frac{\frac{1}{Mn_R} \cdot \sum_{m=1}^{M}\sum_{t=1}^{n_T}\sum_{r=1}^{n_R} (|h_{m,rt}(q)|^2)}{\sigma_n^2 + I_n^2(q)} \quad (8)$$

Where M is the number of sub-carriers, $n_T$ is the number of transmitter antennas, $n_R$ is the number of receiver antennas, $\sigma_n^2$ is the variance of the noise and $I_m^2$ (q) is the power of the interference for beam possibility q.

Other measures for SINR would also be possible.

Beam Selection in Controller 20 with Receivers with Multiple Receiver Chains—Correlation Parameter Estimation To estimate the correlation factor between the received signals for each of the beam possibilities q, it is proposed to estimate first the correlation matrix R(q) for each of the these possibilities, $$R(q) = E[\text{vec}(H(q)) \cdot \text{vec}^H(H(q))] \quad (9)$$

Where E [.] denotes the expectation (or mean) operation, vec (.) is the vectorization operation and the superscript H is the Hermitian transpose (or complex transpose conjugate) operator. The matrix H (q) is the channel matrix (with $n_R$ rows and $n_T$ columns) containing all of the channel responses between the transmitters and the receivers for beam possibility q. H(q) is given by, $$H(q) = \begin{pmatrix} h_{11}(q) & \cdots & h_{1n_T}(q) \\ \cdots & \cdots & \cdots \\ h_{n_R 1}(q) & \cdots & h_{n_R n_T}(q) \end{pmatrix} \quad (10)$$

The vec (.) operation stacks the columns of H (q) to form a vector with $n_T n_R$ rows, $$\text{vec}(H(q)) = \begin{pmatrix} h_{11}(q) \\ \cdots \\ h_{n_R 1}(q) \\ h_{1n_T}(q) \\ \cdots \\ h_{n_R n_T}(q) \end{pmatrix} \quad (11)$$

The vec(H(q)).$\text{vec}^H$(H(q)) product in equation (9) is therefore a matrix with $n_T n_R$ row and $n_T n_R$ columns.

To obtain the expectation value needed for equation (9), there are several possibilities. If we are using a system with M sub-carriers (a typical OFDM system), one possibility is to form the expectation values by averaging over the channel matrix for each sub-carrier.

$$R(q) = \frac{1}{M} \sum_{m=1}^{M} [\text{vec}(H_m(q)) \cdot \text{vec}^H(H_m(q))] \quad (12)$$

where $$H_m(q) = \begin{pmatrix} h_{m,11}(q) & \cdots & h_{m,1n_T}(q) \\ \cdots & \cdots & \cdots \\ h_{m,n_R 1}(q) & \cdots & h_{m,n_R n_T}(q) \end{pmatrix} \quad (13)$$

Alternatively, if the system is only using one carrier, the expectation values can be formed by averaging over multiple channel estimates for the beam possibility q obtained from multiple channel estimation slots for the beam possibility q.

The correlation matrix R(q) (from equation 9) contains in it's off diagonal elements the correlation of all of the channel responses with respect to each other whereas the diagonal elements of R(q) contains the power of the different channel responses.

We therefore propose to calculate our correlation factor (which indicates the level of correlation for the different channel responses) for each beam possibility q as follows, $$\text{Correlation factor}(q) = \frac{\sum_{\substack{j=1 \\ j \neq 1}}^{n_R n_T} \sum_{i=1}^{n_R n_T} r_{ij}^2(q)}{\sum_{i=1}^{n_R n_T} r_{ii}^2(q)} \quad (14)$$

$$= \frac{\text{sum of power of non-diagonal elements of } R(q)}{\text{sum of power of diagonal elements of } R(q)}$$

Where $r_{ij}$(q) is the element located at the ith row and jth column of matrix R(q)

The invention claimed is:

1. A device for transmitting and/or receiving signals in a wireless communication system, comprising:
a number of antennas, each of the antennas having a fundamental antenna beam radiation pattern;
an antenna beam selection controller configured to control a selection of said antennas for the transmission and/or reception of signals on the basis of channel estimates obtained at least for each of the fundamental antenna beam radiation patterns and at least for some combinations of the fundamental antenna beam radiation patterns; and
a channel estimator configured to obtain a channel estimate for a combination of fundamental antenna beam radiation patterns by the sum of the channel estimates of the corresponding fundamental antenna beam radiation patterns divided by the number of corresponding fundamental beam positions.

2. The device according to claim 1,
wherein signals in said communication system are transmitted and received in preambles and data sections, a preamble comprising a respective preamble slot with channel estimation information for at least each of said fundamental antenna beam radiation patterns, wherein said antenna beam selection controller is configured to control the selection of said antennas so that each antenna receives the respective preamble slot with the channel estimation information for the respective fundamental antenna beam.

3. The device according to claim 1, further comprising:
a single receiver chain,
wherein said antenna beam selection controller is configured to control the selection of antennas by calculating a signal-to-noise value on the basis of the obtained channel estimates.

4. The device according to claim 3,
wherein said antenna beam selection controller is configured to control the selection of antennas on the basis of one of the highest of said calculated signal-to-noise values.

5. The device according to claim 1, further comprising:
two or more receiver chains,
wherein said antenna beam selection controller is configured to control the selection of antennas on the basis of a signal-to-noise value and a correlation factor.

6. The device according to claim 5,
wherein said antenna beam selection controller is configured to control the selection of antennas on the basis of one of the highest of said calculated signal-to-noise values and one of the lowest of said correlation factors.

7. The device according to one of claim 5 or 6,
wherein said antenna beam selection controller is configured to calculate said correlation factors on the basis of a correlation matrix.

8. The device according to claim 7,
wherein said antenna beam selection controller is configured to calculate said correlation factor on the basis of the sum of the power of the non diagonal elements of the correlation matrix divided by the sum of the power of the diagonal elements of the correlation matrix.

9. A method for controlling a selection or combination of antennas in a wireless communication system, comprising the steps of:
controlling a selection or combination of antennas for the transmission and/or reception of signals from a number of antennas, each of the number of antennas having a fundamental antenna beam radiation pattern, on the basis of channel estimates obtained at least for each of the fundamental antenna beam radiation patterns and at least for some combinations of the fundamental antenna beam radiation patterns; and
obtaining a channel estimate for a combination of fundamental antenna beam radiation patterns by the sum of the channel estimates of the corresponding fundamental antenna beam radiation patterns divided by the number of corresponding fundamental beam positions.

10. The method according to claim 9,
wherein signals in said communication system are transmitted and received in preambles and data sections, a preamble comprising a respective preamble slot with channel estimation information for at least each of said fundamental antenna beam radiation patterns, wherein the selection of said antennas is controlled so that a each antenna receives the respective preamble slot with the channel estimation information for the respective fundamental antenna beam.

11. The method according to claim 9,
wherein said selection of antennas is controlled by calculating a signal-to-noise value on the basis of the obtained channel estimates.

12. The method according to claim 11,
wherein said selection of antennas is controlled on the basis of one of the highest of said calculated signal-to-noise values.

13. The method according to claim 9,
wherein said selection of antennas is controlled on the basis of a signal-to-noise value and a correlation factor.

14. The method according to claim 13,
wherein said selection of antennas is controlled on the basis of one of the highest of said calculated signal-to-noise values and one of the lowest of said correlation factors.

15. The method according to one of claim 13 or 14,
wherein said correlation factors are calculated on the basis of a correlation matrix.

16. The method according to claim 15,
wherein said correlation factor is calculated on the basis of the sum of the power of the non diagonal elements of the correlation matrix divided by the sum of the power of the diagonal elements of the correlation matrix.

17. A non-transitory computer readable medium having computer instructions recorded thereon, the computer instructions configured to make a communication device execute a method of controlling a selection or combination of antennas, the method comprising the steps of:
controlling a selection or combination of antennas for the transmission and/or reception of signals from a number of antennas, each of the number of antennas having a fundamental antenna beam radiation pattern, on the basis of channel estimates obtained at least for each of the fundamental antenna beam radiation patterns and at least for some combinations of the fundamental antenna beam radiation patterns; and
obtaining a channel estimate for a combination of fundamental antenna beam radiation patterns by the sum of the channel estimates of the corresponding fundamental antenna beam radiation patterns divided by the number of corresponding fundamental beam positions.

* * * * *